United States Patent
Murakami

(10) Patent No.: US 7,823,388 B2
(45) Date of Patent: Nov. 2, 2010

(54) GAS TURBINE ENGINE CONTROL SYSTEM

(75) Inventor: Hisashi Murakami, Wako (JP)

(73) Assignee: Honda Motor Co., Ltd., Minato-Ku, Tokyo (JP)

(*) Notice: Subject to any disclaimer, the term of this patent is extended or adjusted under 35 U.S.C. 154(b) by 1248 days.

(21) Appl. No.: 11/395,299

(22) Filed: Apr. 3, 2006

(65) Prior Publication Data

US 2006/0218929 A1    Oct. 5, 2006

(30) Foreign Application Priority Data

Apr. 4, 2005    (JP)    ............................. 2005-107111

(51) Int. Cl.
*F02C 9/00*    (2006.01)

(52) U.S. Cl. ..................... 60/773; 60/39.281; 60/776; 60/746

(58) Field of Classification Search ............. 60/39.281, 60/746, 747, 773, 776, 737, 738
See application file for complete search history.

(56) References Cited

U.S. PATENT DOCUMENTS 3,712,055 A * 1/1973 McCabe .................. 60/39.281
5,878,566 A * 3/1999 Endo et al. ..................... 60/773
6,745,558 B2   6/2004 Murakami et al.

* cited by examiner

*Primary Examiner*—Michael Cuff
*Assistant Examiner*—Vikansha S Dwivedi
(74) *Attorney, Agent, or Firm*—Squire, Sanders & Dempsey, LLP

(57) ABSTRACT

In a gas turbine engine control system having a first valve for regulating the flow rate of fuel in premixed combustion and a second valve for regulating that in diffusion combustion, when the combustion mode is switched from one mode to the other mode, whichever of the first and second valves is associated with the other combustion mew is opened to supply the amount of fuel required for conducting the other combustion mode and, the opening of the valve associated with the one combustion mode is gradually decreased, while that of the other combustion mode is gradually increased, thereby maintaining the total amount of fuel supplied to the engine constant, after elapse of a predetermined period. At the time of switching the combustion mode, therefore, the total amount of fuel supplied to the engine can be accurately controlled to a desired value to minimize engine speed fluctuation.

14 Claims, 7 Drawing Sheets

FIG. 3

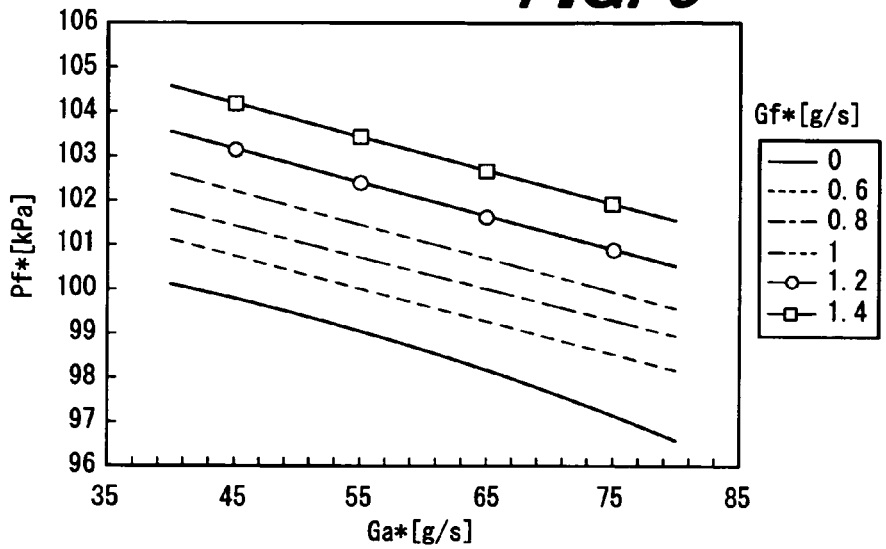

Ga : AIR FLOW RATE [kg/sec]
Ga* : CORRECTED AIR FLOW RATE [kg/sec]
Gf : FUEL FLOW RATE [kg/sec]
Gfpre : PREMIXED FUEL FLOW RATE [kg/sec]
Gfdiff : DIFFUSION FUEL FLOW RATE [kg/sec]
Gf* : CORRECTED FUEL FLOW RATE [kg/sec]
Gfpre* : CORRECTED PREMIXED FUEL FLOW RATE [kg/sec]
Gfdiff* : CORRECTED DIFFUSION FUEL FLOW RATE [kg/sec]
Pa : MIXER INLET AIR PRESSURE [kPa abs]
Pfdiff : DIFFUSION FUEL PRESSURE [kPa abs]
Pfpre : PREMIXED FUEL PRESSURE [kPa abs]
Pfpre* : CORRECTED PREMIXED FUEL PRESSURE [kPa abs]
$\Delta Pa\text{-}f$ : DIFFERENTIAL PRESSURE BETWEEN MIXER INLET AIR PRESSURE AND PREMIXED FUEL PRESSURE [kpa]
Ta : MIXER INLET AIR TEMPERATURE [°C]
Tfpre : PREMIXED FUEL TEMPERATURE [°C]
Ts : BASE TEMPERATURE [°C]
Ps : BASE PRESSURE [kPa abs]
Tad : ADIABATIC FLAME TEMPERATURE [°C]
Tadlimt : PREMIXED COMBUSTION FLAMEOUT LIMIT ADIABATIC FLAME TEMPERATURE [°C]
Tads-pre : ADIABATIC FLAME TEMPERATURE FOR SWITCHING TO PREMIXED COMBUSTION (THRESHOLD VALUE)[°C]
Tads-diff : ADIABATIC FLAME TEMPERATURE (THRESHOLD VALUE) FOR SWITCHING TO DIFFUSION COMBUSTION (THRESHOLD VALUE)[°C]
Talimt : PREMIXED COMBUSTION LOWER LIMIT MIXER INLET AIR TEMPERATURE [°C]
HC : LOWER CALORIFIC VALUE
Cpgas : SPECIFIC HEAT OF GAS FUEL AT CONSTANT PRESSURE $$Ga* = Ga \times \frac{Ps}{Pa} \times \sqrt{\frac{Ta}{Ts}}$$

$$Gfpre* = Gfpre \times \frac{Ps}{Pfpre} \times \sqrt{\frac{Tfpre}{Ts}}$$

$$Pfpre = Pa + \Delta Pa\text{-}f$$

$$Pfpre* = Pfpre \times \frac{Ps}{Pa}$$

$$Tad = \frac{Gf \times Hc}{Ga \times Cpgas} + Ta$$

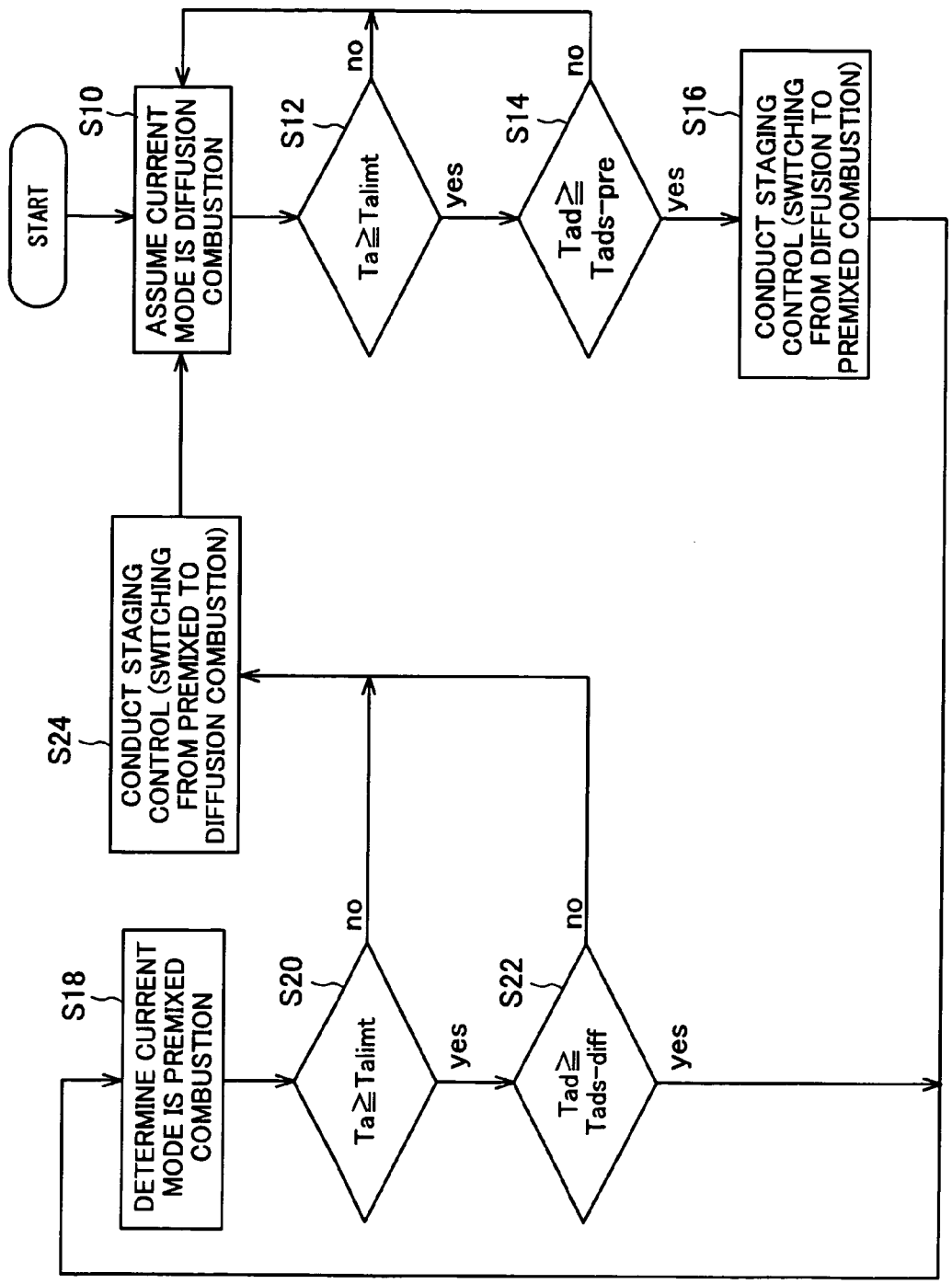

GAS TURBINE ENGINE CONTROL SYSTEM

BACKGROUND OF THE INVENTION

1. Field of the Invention

This invention relates to a gas turbine engine control system, particularly a control system for a stationary gas turbine engine.

2. Description of the Related Art

Gas turbine engines, particularly stationary gas turbine engines, are being developed as small units for connection with relatively small output generators to build on site (private) power generation systems. This type of gas turbine engine uses gas as fuel. The gas fuel and air are supplied to a burner to produce premixed combustion or diffusion combustion.

When these combustion modes are compared with regard to emission performance, premixed combustion is found to be superior from the viewpoint of low emissions. This is because the disadvantage of NOx emission concentration increasing with higher combustion temperature is offset by the advantage of being able to achieve combustion with a uniform temperature distribution in premixed combustion. However, the combustion temperature in premixed combustion is lower than that in diffusion combustion, meaning that the combustion is unstable and susceptible to flame failure, so that the temperature range in which premixed combustion is feasible is limited.

Although diffusion combustion is possible over the full range of combustion temperatures, the NOx emission concentration increases at scattered high-temperature regions. In the interest of reducing emissions, therefore, it is preferable to switch the combustion mode from diffusion combustion to premixed combustion when premixed combustion is possible.

With this in mind, U.S. Pat. No. 6,745,558, filed by the assignee, teaches a system that switches the combustion mode between premixed combustion and diffusion combustion in response to the combustion state, i.e., adiabatic flame temperature or air temperature at the inlet of the venturi mixer. The system set out in this reference is equipped with a first valve for regulating fuel used in premixed combustion and a second valve for regulating fuel used in diffusion combustion. The combustion mode switching is effected by controlling the openings of the two valves. Specifically, the opening of the second valve is controlled from the beginning to the end of combustion mode switching so that the part of all fuel supplied to the gas turbine engine which constitutes fuel for diffusion combustion is supplied at the minimum required for conducting diffusion combustion, and the opening of the first valve is controlled to supply the remainder as fuel for premixed combustion. The aim in conducting combustion in both modes while the switching of the combustion mode is in progress is to achieve stable switching. As will be noted in FIGS. 7 and 8 of this reference, the opening/closing of the valves is conducted simultaneously.

The fuel regulated by the first and second valves is supplied to the gas turbine engine through fuel pipes. The fuel supplied upon opening the first or second valve therefore reaches the burner after a delay proportional to the volume of the fuel pipe. Therefore, when the valves are opened/closed simultaneously at the beginning of combustion mode switching, the total amount of fuel supplied to the gas turbine engine (to its burner) momentarily falls below the desired amount to cause undesirable fluctuation of the engine speed.

In addition, in the case of the conventional arrangement wherein the part of the fuel supplied to the gas turbine engine for diffusion combustion is supplied at the minimum required for conducting diffusion combustion and the remaining part is supplied as fuel for premixed combustion, the change in the amount of fuel for diffusion combustion or for premixed combustion at the beginning or end of switching is relatively large. As a result, the total amount of fuel at the beginning and end of switching deviates from the desired value. This is liable to cause fluctuation of the engine speed.

SUMMARY OF THE INVENTION

An object of this invention is therefore to overcome the foregoing drawbacks by providing a gas turbine engine control system that minimizes engine speed fluctuation by accurately controlling to the desired value the total amount of fuel supplied to the gas turbine engine at the time of switching the combustion mode either way between premixed combustion and diffusion combustion.

In order to achieve the object, this invention provides a system for controlling a gas turbine engine, comprising: a first valve regulating a flow rate of fuel used in premixed combustion; a second valve regulating the flow rate of fuel used in diffusion combustion; and a controller switching the combustion from one to other between the premixed combustion and the diffusion combustion and operating one of the first valve and the second valve associated with the other combustion to be switched so as to supply an amount of fuel required for conducting the other combustion to be switched; wherein the controller decreases the opening of the valve associated with the one combustion to be switched from, while increasing the opening of the valve associated with the other combustion to be switched to, thereby maintaining a total amount of the fuel supplied to the engine constant, after elapse of a predetermined period since opening of the valve associated with the other combustion mode to be switched to.

BRIEF DESCRIPTION OF THE DRAWINGS

The above and other objects and advantages of the invention will be more apparent from the following description and drawings in which:

FIG. 3 is a graph for explaining characteristics of mapped data used in the processing performed in a block B3 of FIG. 2;

FIG. 4 is a flowchart showing the processing performed in blocks B6 and B7 of FIG. 2;

DETAILED DESCRIPTION OF THE PREFERRED EMBODIMENT

A gas turbine engine control system according to an embodiment of the present invention will now be explained with reference to the attached drawings.

Figure 1:
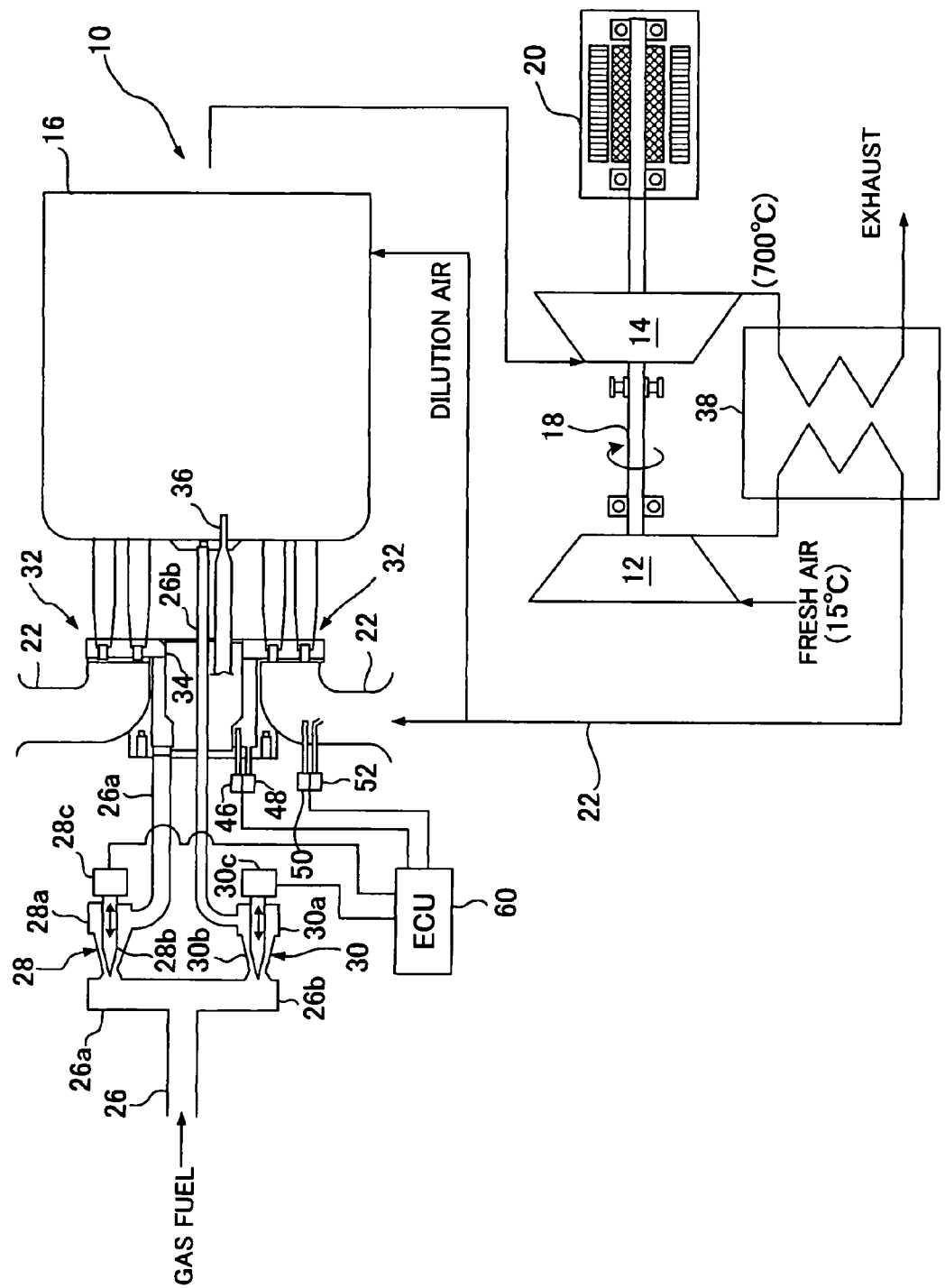
FIG. 1 is a schematic view of a gas turbine engine control system according to an embodiment of this invention.

FIG. 1 is a schematic view of a gas turbine engine control system according to an embodiment of this invention.

An overall gas turbine engine is designated by reference numeral 10 in FIG. 1. The gas turbine engine 10 comprises a compressor 12, a turbine 14 and a combustor 16. The compressor 12 connected via an output shaft (turbine shaft) 18 to the turbine 14 is driven by the rotation of the turbine 14.

The output shaft of the turbine 14 is also connected to a generator 20. The generator 20 is driven by the rotation of the turbine 14 to generate around 100 kW of electric power. Electrical equipment (not shown) is connected to the generator 20 as an electric load. An air intake path 22 communicating with an air intake port (not shown) and a fuel pipe (fuel supply path) 26 communicating via a booster 24 (shown in FIG. 2) with a fuel source (not shown) are connected to the combustor 16. The fuel is gas such as natural gas or the like.

The fuel pipe 26 bifurcates into a branch fuel pipe 26a and a branch fuel pipe 26b. The fuel pipe 26a is provided at its midway with a first valve 28 that regulates flow rate of fuel used for premixed combustion (hereinafter referred to as "premixed fuel"). The fuel pipe 26b is provided at its midway with a second valve 30 that regulates flow rate of fuel used for diffusion combustion (hereinafter referred to as "diffusion fuel").

The first valve 28 (and the second valve 30) comprises a housing 28a (30a) connected to the fuel pipe 26a (26b), a needle valve body 28b (30b) accommodated in the housing 28a (30a) to be freely moved backward and forward therein, and an actuator 28c (30c) such as a linear solenoid for axially advancing/retracting the needle valve body 28b (30b). The fuel pipe 26a is connected at the downstream of the first valve 28 to a common chamber 34 of a multiplex venturi mixer 32. The multiplex venturi mixer 32 is composed of a plurality of (e.g., 24) venturi mixers (only two are shown for simplicity of illustration).

Specifically, each of the multiplex venturi mixers 32 comprises a venturi tube and an orifice. The inlet end of the venturi tube communicates with the air intake path 22. The outlet end thereof is constituted as a pipe that opens into the combustor 16 and is formed with a narrow throat of predetermined cross-section area.

The inlet end of the orifice communicates with the common chamber 34. The outlet end thereof is constituted as an opening of predetermined area formed at the throat of the venturi tube. The fuel is injected into air passing through the throat to produce an air-fuel mixture. The fuel pipe 26b penetrates through a partition wall of the combustor 16 to extend into the interior thereof at the downstream of the second valve 30 and injects the fuel into the combustor 16. Reference symbol 36 designates an ignition plug.

As explained in the foregoing, in the gas turbine engine 10, the fuel supplied through the fuel pipe 26a is premixed with air in the multiplex venturi mixer 32 and the air-fuel mixture is supplied into the combustor 16 to produce premixed combustion. The fuel supplied through the fuel pipe 26b is supplied into the combustor 16 separately from air to produce diffusion combustion. The combustion produces combustion gas that makes the turbine 14 rotate to drive the compressor 12 and generator 20 through the output shaft 18.

As shown in the bottom of FIG. 1, since the combustion gas used to rotate the turbine 14 remains at a high temperature of 700° C. or thereabout, it is sent to a heat exchanger 38 such that the combustion gas is used therein to elevate the temperature of the fresh air (atmospheric air at a temperature of, for example, 15° C.) sucked in by the compressor 12 to around 600° C. before being supplied to the venturi mixer 32.

The illustrated gas-turbine engine 10 is thus of the regenerative type. Part of the high-temperature air is mixed with the combustion gas to dilute it.

The fuel pipe 26a upstream of the venturi mixer 32, precisely of its orifice, is installed with a first temperature sensor 46 that produces an output proportional to a fuel temperature Tf (specifically, a premixed fuel temperature Tfpre) at a position upstream of the orifice, i.e., the inlet of the mixer, and with a first pressure sensor 48 that produces an output proportional to differential pressure ΔPa-f (differential pressure between a mixer inlet air pressure and premixed fuel pressure).

The air intake path 22 upstream of the venturi mixer 32, precisely of its venturi tube, is installed with a second temperature sensor 50 that produces an output proportional to air temperature (mixer inlet air temperature) Ta at a position upstream of the venturi tube or inlet, and with a second pressure sensor 52 that produces an output proportional to pressure (mixer inlet air pressure) Pa at a position upstream of the venturi tube or inlet.

The outputs of the aforementioned sensors are sent to an ECU (electronic control unit) 60. The ECU 60 comprising a microcomputer is equipped with a CPU, ROM, RAM and the like. The ECU 60 detects the pressure of the gas fuel, specifically the premixed fuel pressure Pfpre based on the output proportional to the differential pressure ΔPa-f sent from the first pressure sensor 48 and the output proportional to the mixer inlet air pressure Pa sent from the second pressure sensor 52.

The operation of the gas turbine engine control system according to this embodiment will now be explained. The processing for the operation is executed in the ECU 60.

Figure 2:
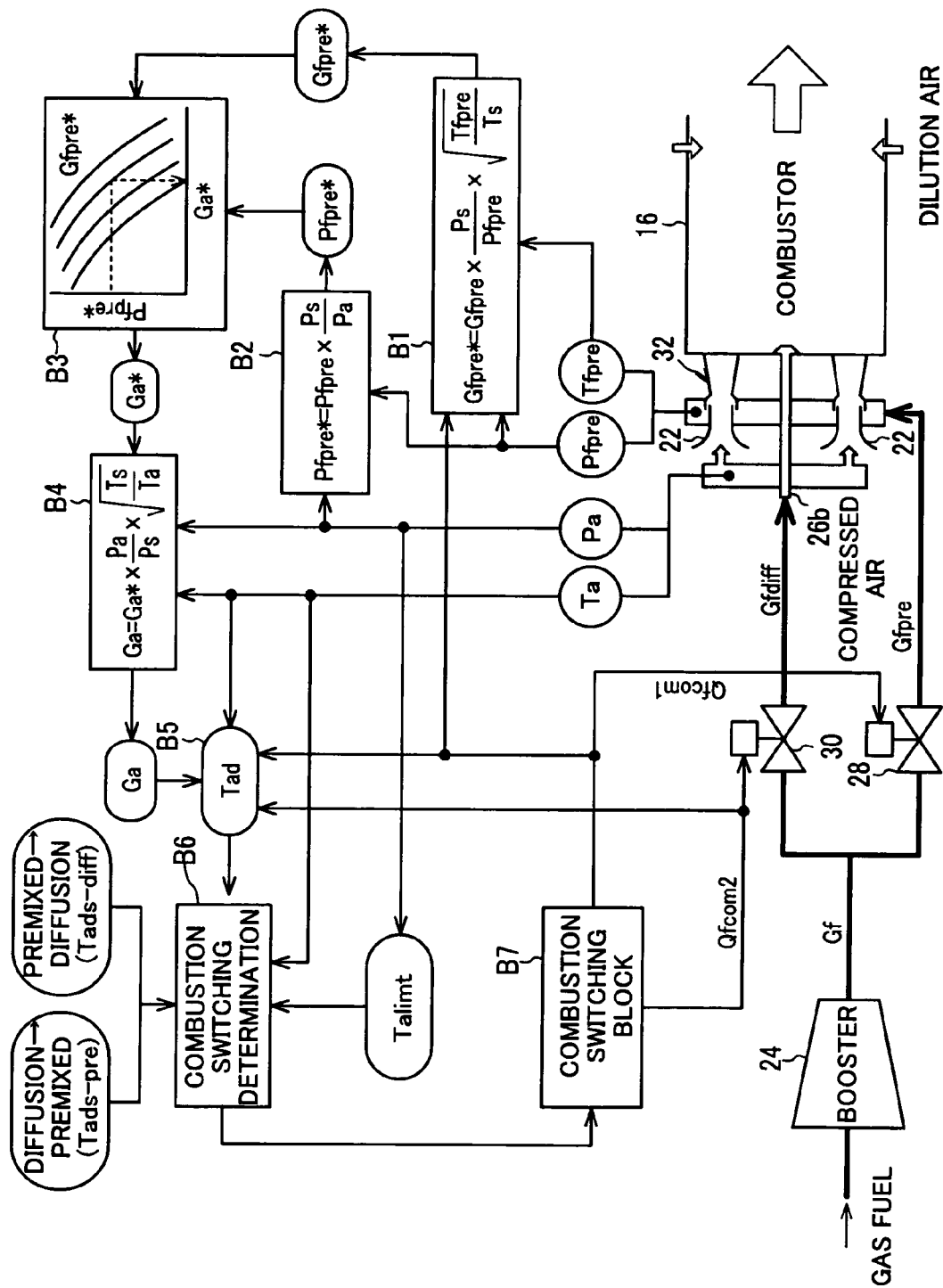
FIG. 2 is a block diagram showing the operation of the system shown in FIG. 1.

The operation is shown in FIG. 2 in the form of a block diagram.

First, based on one combustion mode between premixed combustion and diffusion combustion, the ECU 60 calculates or determines flow rate commands Qfcom1 and Qfcom2 from the rotational speeds (rpm) of the generator 20 and turbine output shaft 18 in accordance with appropriate characteristics and converts them to valve opening command values for output to the associated first and second valves 28, 30. As a result, the burner 16 is supplied with fuel at a flow rate corresponding to the valve opening command values.

Specifically, when the result of this operation is to open the first valve 28 and close the second valve 30, premixed fuel is supplied to produce premixed combustion. When the result is to close the first valve 28 and open the second valve 30, diffusion fuel is supplied to produce diffusion combustion. Thus the combustion mode is switched by regulating the openings of the first and second valves 28, 30. In the following, the flow rate of the fuel for premixed combustion will be called premixed fuel flow rate Gfpre and that of the diffusion combustion will be called diffusion fuel flow rate Gfdiff.

Next, at B1, the ECU 60 calculates or determines a corrected value Gfpre* of the premixed fuel flow rate Gfpre supplied to the burner 16 (corrected premixed fuel flow rate) by substituting into the indicated equation the premixed fuel flow rate Gfpre corresponding to the calculated flow rate command Qfcom1, and the premixed fuel pressure Pfpre and premixed fuel temperature Tfpre among the aforesaid sensor outputs. Further, at B2, the ECU 60 calculates or determines a corrected value Pfpre* of the premixed fuel pressure Pfpre among the aforesaid sensor outputs (corrected premixed fuel pressure) and, at B3, calculates or determines a corrected air flow rate Ga* supplied to the burner 16 by retrieval from mapped data using the calculated corrected premixed fuel flow rate Gfpre* and corrected premixed fuel pressure Pfpre*.

The mapped data characteristics are shown at the top of FIG. 3 and the equations appearing at B1 and elsewhere are shown below along with the parameters used there. The corrected air flow rate Ga* is calculated in accordance with the equation shown in the lower part of FIG. 3. In this specification, all flow rates are mass flow rates. Although the calculations in B1 and elsewhere are indicated taking the premixed fuel flow rate Gfpre as an example, they similarly apply to the diffusion fuel flow rate Gfdiff.

The mapped data shown in FIG. 3 are data prepared beforehand using data obtained by actually measuring the flow rate characteristics of the venturi mixer 32. As shown, data can be retrieved from the mapped data using the corrected fuel flow rate Gf* and corrected fuel pressure Pf*. FIG. 3 shows characteristics plotted for six values of the corrected fuel flow rate Gf* but this is only one example.

By "corrected" is meant that the value is converted to that at a pressure and a temperature arbitrarily chosen as base values for mapping purposes. The converted value is suffixed with an asterisk (*). For example, standard atmospheric pressure can be used as the base pressure and 0° C. (or 15° C.) as the base temperature. This preparation of the mapped data using corrected values makes it possible to determine the air flow rate with good accuracy despite difference in temperature or pressure.

Next, in B4, the corrected air flow rate Ga* retrieved from the mapped data is multiplied by the reciprocal of the equation shown in the lower part of FIG. 3 to calculate the pre-corrected air flow rate Ga.

Next, in B5, the adiabatic flame temperature Tad is calculated. The equation for the calculation is shown in the lower part of FIG. 3. The first term on the right side of the equation is the temperature rise by combustion and the second term is the initial temperature.

Thus, the calculation of the adiabatic flame temperature Tad is carried out by plotting the flow rate characteristics of the venturi mixer 32 using actually measured data, determining the temperature rise by combustion using an air flow rate and the like retrieved using values corrected with respect to the base pressure and temperature, and adding the determined temperature rise to the initial temperature. As a result, the adiabatic flame temperature Tad can be calculated with good accuracy.

Next, in B6 (combustion switching determination block), a determination on combustion mode switching is made based on the calculated adiabatic flame temperature Tad and the detected mixer inlet air temperature Ta. Specifically, the determination is made by comparing the calculated adiabatic flame temperature Tad with at least an adiabatic flame temperature threshold value Tads-pre used to determine switching from diffusion combustion to premixed combustion and an adiabatic flame temperature threshold value Tads-diff used to determine switching from premixed combustion to diffusion combustion, and comparing the detected mixer inlet air temperature Ta with a premixed combustion lower limit mixer inlet air temperature Talimt. This will be explained in more detail later.

Next, in B7 (combustion switching control block), combustion switching control is performed based on the determination result in B6. More exactly, the combustion mode is switched in B7 when it is determined in B6 that the combustion mode should be switched. In the following, this combustion mode switching will be called "staging."

FIG. 4 is a flowchart showing the processing performed in B6 of FIG. 2. The program shown in FIG. 4 is executed once every 40 milliseconds.

In S10, the current combustion mode is assumed or defined as diffusion combustion. In other words, the program of FIG. 4 is executed on the assumption that the current combustion mode is diffusion combustion. Next, in S12, it is determined whether the detected mixer inlet air temperature Ta is equal to or higher than Talimt. As mentioned above, Talimt is the premixed combustion lower limit mixer inlet air temperature, i.e., it is the lowest mixer inlet air temperature at which premixed combustion is possible.

Figure 5:
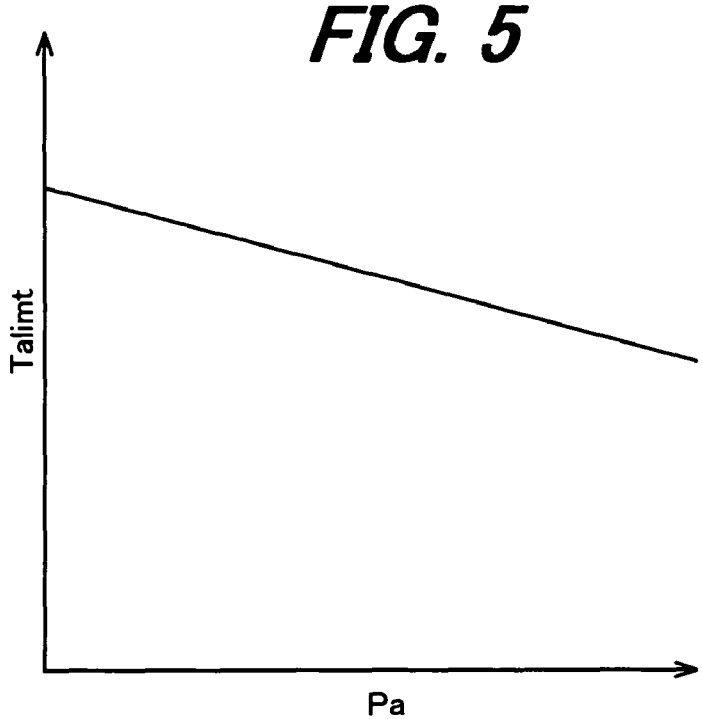
FIG. 5 is a graph showing characteristics of a premixed combustion lower limit mixer inlet air temperature Talimt used in the flowchart of FIG. 4.

FIG. 5 is a graph showing the characteristic of Talimt defined or set with respect to the mixer inlet air pressure Pa. It should be noted that Talimt is defined to vary with the mixer inlet air pressure Pa, namely, it is defined to decrease with increasing mixer inlet air pressure Pa. As a result, the combustion characteristic differs depending on the mixer inlet air temperature and pressure even at one and the same adiabatic flame temperature.

The combustion tends to be stable when the pressure and temperature are high and unstable when they are low. Because the premixed combustion range is defined based not only on the adiabatic flame temperature but also on the mixer inlet air temperature and pressure in this manner, the characteristic curve of FIG. 5 shows it to be determined in relation to the mixer inlet air pressure Pa (and, though not shown, the mixer inlet air temperature). To be more specific, the characteristic curve of FIG. 5 is obtained by plotting Talimt as a function of the values of the mixer inlet air temperature and pressure at which the CO concentration stayed the same.

Figure 6:
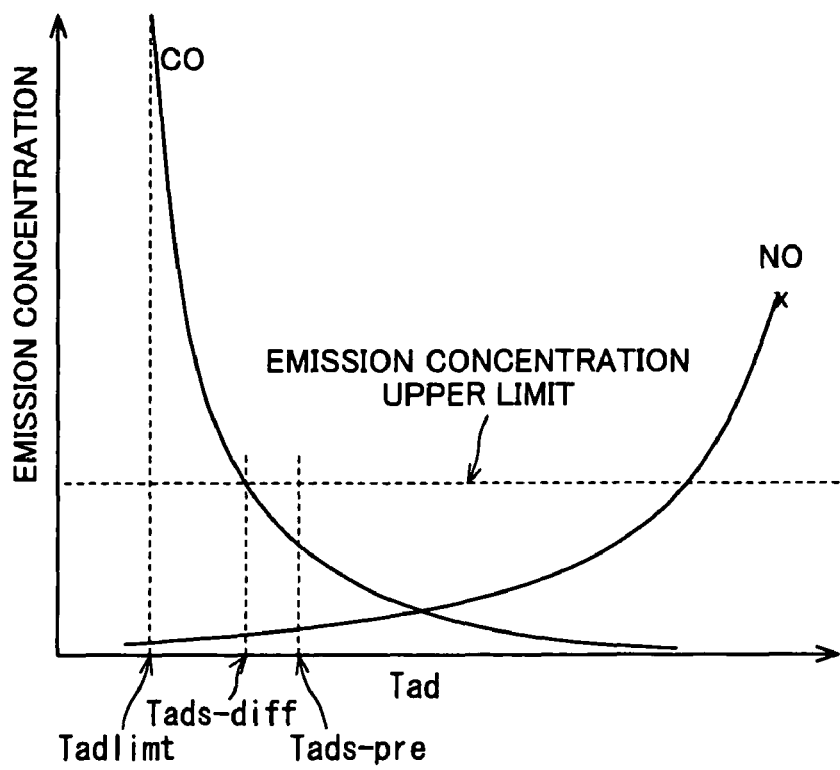
FIG. 6 is a graph showing threshold values used in the flowchart of FIG. 4.

When the result in S12 is NO, premixed combustion is impossible, so the program returns to S10 and the diffusion combustion mode is maintained. When the result is YES, the program goes to S14, in which it is determined whether the calculated adiabatic flame temperature Tad is equal to or greater than the adiabatic flame temperature threshold value Tads-pre. As mentioned above, Tads-pre is an adiabatic flame temperature threshold value used to determine switching from diffusion combustion to premixed combustion. This value is empirically determined as one ensuring stable premixed combustion. As shown in FIG. 6, it is a value set with respect to the adiabatic flame temperature Tad.

When the result in S14 is NO, it can be assumed that the adiabatic flame temperature condition for switching to premixed combustion is not established, so that the program returns to S10 and the diffusion combustion mode is maintained. When the result is YES, it can be assumed that the adiabatic flame temperature condition for switching to premixed combustion is established, so that the program goes to S16, in which staging control for switching the combustion mode from diffusion combustion to premixed combustion is conducted. This is the processing performed in the combustion switching control block (B7) of FIG. 2.

Figure 7:
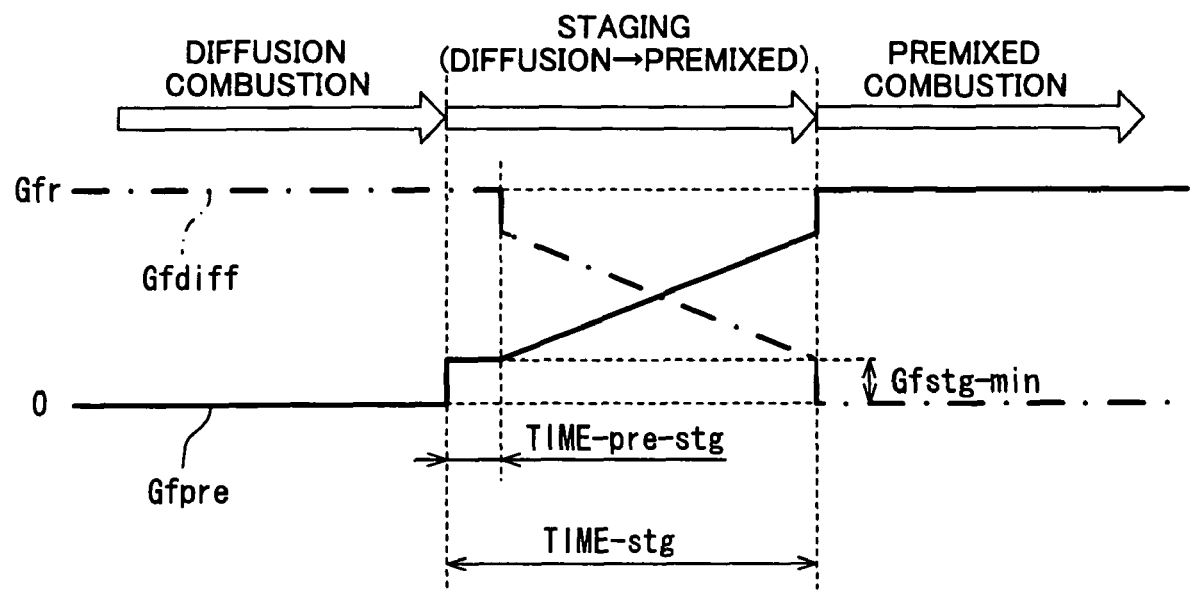
FIG. 7 is a time chart showing the control for switching (staging) the combustion mode from diffusion combustion to premixed combustion, which is performed in block B7 of FIG. 2 and the processing of FIG. 4.

FIG. 7 is a time chart showing the control for switching the combustion mode from diffusion combustion to premixed combustion.

In FIG. 7, Gfr is the fuel flow rate required by the gas turbine engine 10. In other words, Gfr is the desired value of the total amount of fuel (sum of the premixed fuel flow rate Gfpre and the diffusion fuel flow rate Gfdiff) supplied to the gas turbine engine 10 (i.e., the burner 16). As shown in FIG. 7, during diffusion combustion, the flow rate command Qfcom2 is calculated to make the diffusion fuel flow rate Gfdiff equal to the required fuel flow rate Gfr, the opening of the second valve 30 is regulated accordingly, the flow rate command Qfcom1 is calculated to make the premixed fuel flow rate Gfpre zero, and the first valve 28 is closed.

When staging is commenced following a finding in the combustion switching determination block B6 that diffusion combustion can be switched to premixed combustion, at first the second valve 30 is left open and the first valve 28 is opened to supply fuel as required for implementing premixed combustion. Specifically, the first valve 28 is controlled so that the premixed fuel flow rate Gfpre becomes a predetermined flow rate Gfstg-min for a predetermined period TIME-pre-stg (for example, 0.4 sec). The predetermined flow rate Gfstg-min is set to the minimum fuel flow rate required for conducting premixed combustion and diffusion combustion.

As explained above, the first valve 28 is disposed at its midway of the fuel pipe 26a. The premixed fuel supplied upon opening of the first valve 28 therefore reaches the burner 16 after a delay proportional to the volume of the fuel pipe 26a from the first valve 28 to the burner 16 (the fuel pipe volume). Accordingly, at the start of staging, the second valve 30 is kept opened even after opening the first valve 28 in order to compensate for the delay in the supply of premixed fuel owing to the fuel pipe volume. Therefore, during the predetermined period TIME-pre-stg, the burner 16 is actually supplied with only the diffusion fuel flow rate Gfdiff, which is equal to the required fuel flow rate Gfr.

Upon elapse of the predetermined period TIME-pre-stg, the supply to the burner 16 of premixed fuel corresponding to the predetermined flow rate Gfstg-min starts. The opening of the second valve 30 is therefore decreased to instantly lower the diffusion fuel flow rate Gfdiff by the amount of the predetermined flow rate Gfstg-min. The opening of the second valve 30 is then gradually decreased (Gfdiff is gradually decreased) and the opening of the first valve 28 is gradually increased (Gfpre is gradually increased), thereby maintaining the sum of the premixed fuel flow rate Gfpre and diffusion fuel flow rate Gfdiff constant (at Gfr).

Once the diffusion fuel flow rate Gfdiff has fallen to the predetermined flow rate Gfstg-min, the second valve 30 is closed to instantaneously lower the diffusion fuel flow rate Gfdiff to zero, and the opening of the first valve 28 is increased to instantaneously raise the premixed fuel flow rate Gfpre by the amount of the predetermined flow rate Gfstg-min (make it equal to Gfr). This marks the end of staging, whereafter only premixed combustion is conducted in the burner 16. The period TIME-stg between the beginning and end of staging is set at, say, 6 sec.

In the forgoing, it is explained that the predetermined flow rate Gfstg-min is set to the minimum flow rate required for conducting premixed combustion and diffusion combustion and that the instantaneous change in Gfdiff and Gfpre at the beginning of staging (the decrease in Gfdiff and increase in Gfpre) and the instantaneous change therein at the end of staging are both made Gfstg-min.

However, it is alternatively possible to make the changes different. For example, it is possible to set the change at the beginning of staging to the minimum flow rate required for conducting premixed combustion and set the change at the end of staging to the minimum flow rate required for conducting diffusion combustion. When the changes are set in this manner, the total amount of fuel supplied to the gas turbine engine 10 can be maintained constant while enabling combustion mode switching without giving rise to flame failure.

The explanation of the flowchart of FIG. 4 will be continued. Since the combustion mode has been switched to premixed combustion in the forgoing manner, the program goes to S18, in which the current combustion mode is determined to be premixed combustion, and to S20, in which it is determined whether the detected mixer inlet air temperature Ta is equal to or higher than Talimt.

When the result in S20 is YES, the program goes to S22, in which it is determined whether the calculated adiabatic flame temperature Tad is equal to or greater than Tads-diff. As mentioned above, Tads-diff is an adiabatic flame temperature threshold value used to determine switching from premixed combustion to diffusion combustion. As shown in FIG. 6, Tads-diff is set to a lower temperature than Tads-pre.

The threshold value for switching from diffusion combustion to premixed combustion and the threshold value for switching from premixed combustion to diffusion combustion are defined separately as Tads-pre and Tads-diff because if only one threshold value should be defined, any error arising in the calculated value of the adiabatic flame temperature Tad just before or after switching might cause control hunting, which would lead to repeated switching between the two combustion modes.

In addition, the tendency for combustion to become unstable and experience flame failure is stronger when switching from diffusion combustion to premixed combustion than when switching from premixed combustion to diffusion combustion, so that setting Tads-pre to a higher temperature than Tads-diff stabilizes combustion when switching from diffusion combustion to premixed combustion.

When the result in S22 is YES, the program returns to S18 to continue premixed combustion, and when it is NO, meaning that stable premixed combustion is difficult to sustain, the program goes to S24, in which the combustion mode is switched from premixed combustion to diffusion combustion. The program also goes to S24 when the result in S20 is NO.

Figure 8:
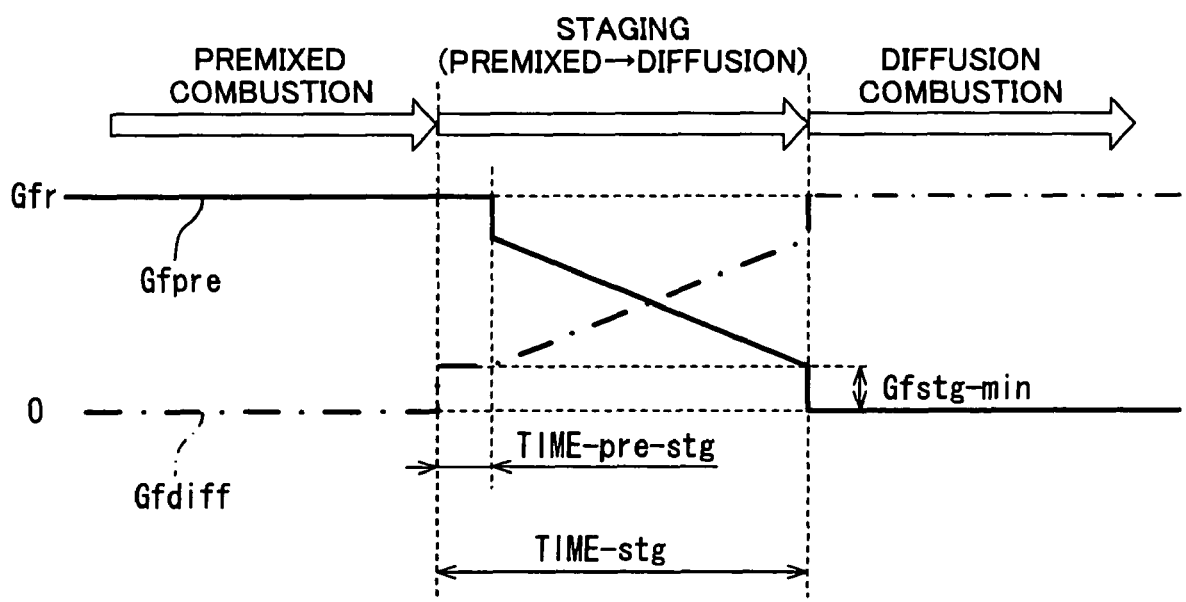
FIG. 8 is a similar time chart showing the control for switching (staging) the combustion mode from premixed combustion to diffusion combustion, which is performed in block B7 of FIG. 2 and the processing of FIG. 4.

FIG. 8 is a time chart showing the control for switching the combustion mode from premixed combustion to diffusion combustion.

As shown in FIG. 8, when staging is commenced following a finding in the combustion switching determination block B6 that premixed combustion should be switched to diffusion combustion, the opening of the first valve 28 is left unchanged and the second valve 30 is kept open throughout the predetermined period TIME-pre-stg so as to supply the amount of fuel required for diffusion combustion (so that the diffusion fuel flow rate Gfdiff becomes the predetermined flow rate Gfstg-min).

Similarly to in the case of switching from diffusion combustion to premixed combustion, this is intended to compensate for the delay in the supply of diffusion combustion fuel owing to the volume of the fuel pipe 26b (fuel pipe volume) from the second valve 30 to the burner 16. Therefore, during the predetermined period TIME-pre-stg, the burner 16 is actually supplied with only the premixed fuel flow rate Gfpre, which is equal to the required fuel flow rate Gfr. (The predetermined period TIME-pre-stg is set with consideration to the fuel pipe volume of the fuel pipes 26a, 26b.)

Upon elapse of the predetermined period TIME-pre-stg, the supply to the burner 16 of diffusion fuel corresponding to the predetermined flow rate Gfstg-min starts. The opening of the first valve 28 is therefore decreased to instantly lower the premixed fuel flow rate Gfpre by the amount of the predetermined flow rate Gfstg-min. The opening of the first valve 28 is then gradually decreased (Gfpre is gradually decreased) and the opening of the second valve 30 is gradually increased (Gfdiff is gradually increased), thereby maintaining the sum of the premixed fuel flow rate Gfpre and diffusion fuel flow rate Gfdiff constant (at Gfr). Once the premixed fuel flow rate Gfpre has fallen to the predetermined flow rate Gfstg-min, the first valve 28 is closed to instantaneously lower the premixed fuel flow rate Gfpre to zero, and the opening of the second valve 30 is increased to instantaneously raise the diffusion fuel flow rate Gfdiff by the amount of the predetermined flow rate Gfstg-min (make it equal to Gfr). This marks the end of staging, whereafter only diffusion combustion is conducted in the burner 16. As in the case of switching from diffusion combustion to premixed combustion, the period TIME-stg between the beginning and end of staging is set at, say, 6 sec.

Also in the case of switching from premixed combustion to diffusion combustion, the instantaneous change in Gfdiff and Gfpre at the beginning of staging (the increase in Gfdiff and decrease in Gfpre) and the instantaneous change therein at the end of staging can be made different. For example, it is possible to set the change at the beginning of staging to the minimum flow rate required for conducting diffusion combustion and set the change at the end of staging to the minimum flow rate required for conducting premixed combustion.

As explained in the foregoing, the gas turbine engine control system according to this embodiment of the invention comprises the first valve 28 for regulating the flow rate of fuel used in premixed combustion and the second valve 30 for regulating the flow rate of fuel used in diffusion combustion, and when the combustion mode is switched from one mode to the other mode (from premixed combustion to diffusion combustion or from diffusion combustion to premixed combustion), whichever of the first valve 28 and second valve 30 is associated with the other combustion mode is opened to supply the amount of fuel required for conducting the other combustion mode and, the opening of the valve associated with the one combustion mode is gradually decreased and the opening of the valve associated with the other combustion mode is gradually increased, thereby maintaining the total amount of fuel supplied to the gas turbine engine 10 (the sum of the premixed fuel flow rate Gfpre and diffusion fuel flow rate Gfdiff) constant (at the required fuel flow rate Gfr of the gas turbine engine 10), after elapse of the predetermined period TIME-pre-stg following opening of the valve associated with the other combustion mode. At the time of switching the combustion mode either way between premixed combustion and diffusion combustion, therefore, the total amount of fuel supplied to the gas turbine engine 10 can be accurately controlled to the desired value (Gfr) to minimize engine speed fluctuation.

Figure 9:
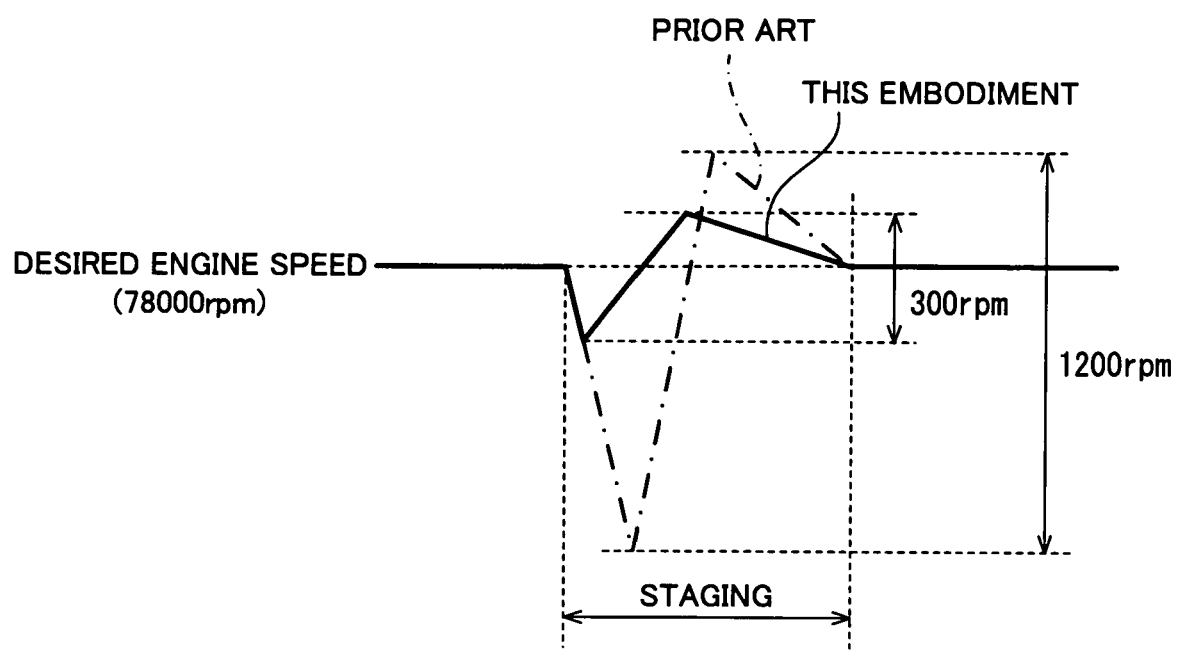
FIG. 9 is an explanatory view comparing engine speed fluctuation during combustion mode switching in the system shown in FIG. 1 with that in the prior art system.

FIG. 9 is an explanatory diagram comparing the engine speed fluctuation during combustion mode switching in the system of this embodiment with that in the prior art system (the system taught by the US patent). As can be seen from the diagram, the embodiment, by compensating for the delay in fuel supply attributable to the fuel pipe volume, makes it possible to markedly reduce the fall in engine speed during switching in comparison with that in the case of the prior system. In addition, the minimization of the fall in engine speed minimizes the subsequent overshoot. As a result, the gas turbine engine control system according to this embodiment succeeds in reducing the engine speed fluctuation range to about one-fourth of that in the prior art system. At a desired engine speed of 78,000 rpm, for example, speed fluctuation diminishes from 1,200 rpm in the conventional system to 300 rpm in this system.

Moreover, the gas turbine engine control system according to this embodiment of invention determines combustion mode switching based on the adiabatic flame temperature, which is a direct indicator of combustion behavior, and the mixer inlet air temperature, which is usable as an indicator of the flame failure limit of the premixed combustion. As this enables accurate prediction of the combustion state, stable combustion mode switching can be achieved and premixed combustion, whose combustion range is narrow, can be effectively utilized to realize reduced emissions.

Further, the adiabatic flame temperature Tad, which is a direct indicator of combustion behavior, is used and compared with two adiabatic flame temperature threshold values, Tads-pre and Tads-diff, premixed combustion is selected when the adiabatic flame temperature Tad is equal to or greater than Tads-pre, and premixed combustion is continued even if the adiabatic flame temperature Tad should thereafter fall below Tads-pre, so long as it is equal to or greater than the second threshold value Tads-diff. Occurrence of control hunting at the time of switching can therefore be prevented.

In addition, the flow rate characteristics of the venturi mixer 32 are mapped using actually measured data and retrieval (determination) is performed using values corrected with respect to the base pressure and temperature. The air flow rate can therefore be determined with good accuracy. And since the temperature rise by combustion calculated using the so-determined air flow rate and the like is added to the initial temperature, the adiabatic flame temperature Tad can be calculated with good accuracy.

The embodiment is thus configured to have a system for controlling a gas turbine engine (10), comprising: a first valve (28) regulating a flow rate of fuel used in premixed combustion; a second valve (30) regulating the flow rate of fuel used in diffusion combustion; and a controller (ECU 60) switching the combustion from one to other between the premixed combustion and the diffusion combustion (from premixed combustion to diffusion combustion or from diffusion combustion to premixed combustion) and operating one of the first valve and the second valve associated with the other combustion to be switched to supply an amount of fuel required for conducting the other combustion to be switched; wherein the controller decreases the opening of the valve associated with the one combustion to be switched from, while increasing the opening of the valve associated with the other combustion to be switched to, thereby maintaining a total amount of the fuel supplied to the engine constant, after elapse of a predetermined period (TIME-pre-stg) since opening of the valve associated with the other combustion mode to be switched to.

In the system, the controller (ECU 60) gradually decreases the opening of the valve associated with the one combustion to be switched to, while gradually increasing the opening of the valve associated with the other combustion to be switched from, thereby maintaining the total amount of the fuel supplied to the engine constant, after elapse of the predetermined period.

In the system, the controller determines to switch the combustion from one to other between the premixed combustion and the diffusion combustion based on at least an adiabatic flame temperature (Tad) and a mixer inlet air temperature (Ta) usable as an indicator of a flame failure limit of the premixed combustion.

In the system, the controller determines to switch the combustion from one to other between the premixed combustion and the diffusion combustion by comparing an adiabatic flame temperature (Tad) with an adiabatic flame temperature threshold value (Tads-pre, Tads-diff).

In the system, the controller determines to switch the combustion from one to other between the premixed combustion and the diffusion combustion by comparing the adiabatic flame temperature (Tad) with a first adiabatic flame temperature threshold value for the premixed combustion (Tads-pre) and a second adiabatic flame temperature threshold value for the diffusion combustion (Tads-diff), and switches to the premixed combustion when the adiabatic flame temperature is equal to or greater than the first threshold value.

In the system, the controller continues the premixed combustion even if the adiabatic flame temperature (Tad) should thereafter fall below the first threshold value (Tads-pre), so long as the temperature (Ta) is equal to or greater than the second threshold value (Tads-diff).

In the system, the first valve (28) is connected with a multiplex venture mixer (32) whose flow rate characteristic is prepared as mapped data using actually measured data such that the mapped data is retrieved using values corrected with respect to a base pressure and temperature.

It should be noted in the above that, although the first valve 28 and second valve 30 in the foregoing embodiment are needle valves, this is not a limitation and any of various other kinds of valves can be used instead. Alternatively, it is possible to use some other fluid flow regulator that functions similarly to a valve.

Japanese Patent Application No. 2005-107111 filed on Apr. 4, 2005 is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a gas turbine engine, comprising:
    a first valve regulating a flow rate of fuel used in premixed combustion;
    a second valve regulating the flow rate of fuel used in diffusion combustion; and
    a controller switching the combustion from one to other between the premixed combustion and the diffusion combustion and operating one of the first valve and the second valve associated with the other combustion to be switched so as to supply an amount of fuel required for conducting the other combustion to be switched;
    wherein the controller decreases the opening of the valve associated with the one combustion to be switched from, while increasing the opening of the valve associated with the other combustion to be switched to, to maintain a total amount of the fuel supplied to the engine constant, after elapse of a predetermined period since opening of the valve associated with the other combustion mode to be switched to.

2. The system according to claim 1, wherein the controller gradually decreases the opening of the valve associated with the one combustion to be switched to, while gradually increasing the opening of the valve associated with the other combustion to be switched from, thereby maintaining the total amount of the fuel supplied to the engine constant, after elapse of the predetermined period.

3. The system according to claim 1, wherein the controller determines to switch the combustion from one to other between the premixed combustion and the diffusion combustion based on at least an adiabatic flame temperature and a mixer inlet air temperature usable as an indicator of a flame failure limit of the premixed combustion.

4. The system according to claim 1, wherein the controller determines to switch the combustion from one to other between the premixed combustion and the diffusion combustion by comparing an adiabatic flame temperature with an adiabatic flame temperature threshold value.

5. The system according to claim 4, wherein the controller determines to switch the combustion from one to other between the premixed combustion and the diffusion combustion by comparing the adiabatic flame temperature with a first adiabatic flame temperature threshold value for the premixed combustion and a second adiabatic flame temperature threshold value for the diffusion combustion, and switches to the premixed combustion when the adiabatic flame temperature is equal to or greater than the first threshold value.

6. The system according to claim 5, wherein the controller continues the premixed combustion even if the adiabatic flame temperature should thereafter fall below the first threshold value, so long as the temperature is equal to or greater than the second threshold value.

7. The system according to claim 1, wherein the first valve is connected with a multiplex venture mixer whose flow rate characteristic is prepared as mapped data using actually measured data such that the mapped data is retrieved using values corrected with respect to a base pressure and temperature.

8. A method of controlling a gas turbine engine having a first valve regulating a flow rate of fuel used in premixed combustion and a second valve regulating the flow rate of fuel used in diffusion combustion, comprising the step of:
    controlling switching the combustion from one to other between the premixed combustion and the diffusion combustion and operating one of the first valve and the second valve associated with the other combustion to be switched so as to supply an amount of fuel required for conducting the other combustion to be switched;
    wherein the step of controlling decreases the opening of the valve associated with the one combustion to be switched from, while increasing the opening of the valve associated with the other combustion to be switched to, to maintain a total amount of the fuel supplied to the engine constant, after elapse of a predetermined period since opening of the valve associated with the other combustion mode to be switched to.

9. The method according to claim 8, wherein the step of controlling gradually decreases the opening of the valve associated with the one combustion to be switched to, while gradually increasing the opening of the valve associated with the other combustion to be switched from, thereby maintaining the total amount of the fuel supplied to the engine constant, after the elapse of the predetermined period.

10. The method according to claim 8, wherein the step of controlling determines to switch the combustion from one to other between the premixed combustion and the diffusion combustion based on at least an adiabatic flame temperature and a mixer inlet air temperature usable as an indicator of a flame failure limit of the premixed combustion.

11. The method according to claim 8, wherein the step of controlling determines to switch the combustion from one to other between the premixed combustion and the diffusion combustion by comparing an adiabatic flame temperature with an adiabatic flame temperature threshold value.

12. The method according to claim 11, wherein the step of controlling determines to switch the combustion from one to other between the premixed combustion and the diffusion combustion by comparing the adiabatic flame temperature with a first adiabatic flame temperature threshold value for the premixed combustion and a second adiabatic flame temperature threshold value for the diffusion combustion, and switches to the premixed combustion when the adiabatic flame temperature is equal to or greater than the first threshold value.

13. The method according to claim 12, wherein the step of controlling continues the premixed combustion even if the adiabatic flame temperature should thereafter fall below the first threshold value, so long as the temperature is equal to or greater than the second threshold value.

14. The method according to claim 8, wherein the first valve is connected with a multiplex venture mixer whose flow rate characteristic is prepared as mapped data using actually measured data such that the mapped data is retrieved using values corrected with respect to a base pressure and temperature.

* * * * *